United States Patent [19]

McPherson, Jr. et al.

[11] Patent Number: 5,546,570
[45] Date of Patent: Aug. 13, 1996

[54] EVALUATION STRATEGY FOR EXECUTION OF SQL QUERIES INVOLVING RECURSION AND TABLE QUEUES

[75] Inventors: John A. McPherson, Jr.; Mir H. Pirahesh; Tuong C. Truong, all of San Jose; Daniel J. Coyle, Jr., Sunnyvale, all of Calif.

[73] Assignee: International Business Machines Corporation, Armonk, N.Y.

[21] Appl. No.: 390,112

[22] Filed: Feb. 17, 1995

[51] Int. Cl.$^6$ .................................................. G06F 17/30
[52] U.S. Cl. .................................. 395/600; 364/DIG. 1; 364/282.1; 364/283.4
[58] Field of Search ..................................... 395/600, 700

[56] References Cited

PUBLICATIONS

Haas et al., "Extensible Query Processing in Starburst", IBM Almaden Research Center, San Jose, CA (US), ACM 1989, pp. 377–388.
Selinger et al, "Access Path Selection in a Relational Database Management System", IBM Research Division, San Jose, CA (US), *ACM*, 1979, pp. 23–34.
Lohman et al., "Research Report—Query Processing in R*", IBM Research Laboratory, San Jose, CA (US) IBM Research Division, Apr. 1984, pp. 1–33.
Lafortune et al., "A State Transition Model for Distributed Query Processing", University of California, *ACM transactions on Database Systems*, vol. 11, No. 3, Sep 1986 (294–322).

*Primary Examiner*—Paul V. Kulik
*Attorney, Agent, or Firm*—Merchant, Gould, Smith, Edell, Welter & Schmidt

[57] ABSTRACT

The present invention provides an evaluation strategy for the execution of SQL queries involving recursion and table queues in a relational database management system. The table queue is established for the query in the memory of the computer, and tuples are generated by tuple-producing operators in the query for storage into the table queue. As operators of the query read the stored tuples from the table queue, a first end-of-file condition, termed a Temporary End-Of-File, occurs when all of the tuples currently stored in the table queue have been retrieved and control is returned to the operator reading from the table queue. A retry request for additional tuples is generated by the operator through the table queue to the tuple-producing operators. If the tuple-producing operators can generate additional tuples, then these additional tuples are stored into the table queue and control is returned to the operator reading from the table queue in response to the retry request. If the tuple-producing operators cannot generate the additional tuples, then a second end-of-file condition, termed a Permanent End-Of-File, occurs and control is returned to the operator reading from the table queue.

21 Claims, 7 Drawing Sheets

EVALUATION STRATEGY FOR EXECUTION OF SQL QUERIES INVOLVING RECURSION AND TABLE QUEUES

BACKGROUND OF THE INVENTION

1. Field of the Invention

This invention relates in general to database management systems performed by computers, and in particular, to an evaluation strategy for the execution of SQL queries involving recursion and table queues in a relational database management system.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Relational operations are provided in SQL that allow the user to manipulate the data, wherein each operator operates on either one or two tables and produces a new table, as a result. The power of SQL lies on its ability to link information from multiple tables or views together to perform complex sets of procedures with a single statement.

However, there are some weaknesses in SQL that limit its effectiveness. For example, the response time for SQL queries may be limited because an entire view or query must be completely materialized before it is used and presented for display. Further, SQL lacks pipelining capabilities that speed the retrieval off data. In addition, recursion capabilities in SQL are inefficient in implementing repetitive processes in SQL, wherein the results of each repetition depends on the results of the previous repetition.

Thus, there is a need in the art for techniques for implementing queuing and recursion in the execution of SQL queries.

SUMMARY OF THE INVENTION

To overcome the limitations in the prior art described above, and to overcome other limitations that will become apparent upon reading and understanding the present specification, the present invention discloses a method and apparatus for evaluating the execution of SQL queries in a relational database management system, wherein the execution of the SQL queries involves recursion and table queues. The table queue is established for the query in the memory of the computer, and tuples are generated by tuple-producing operators in the query for storage into the table queue. As operators of the query read the stored tuples from the table queue, a first end-of-file condition, termed a Temporary End-Of-File, occurs when all of the tuples currently stored in the table queue have been read and is returned to the operator. A retry request for additional tuples is generated by the operator through the table queue to the tuple-producing operators. If the tuple-producing operators can generate additional tuples, then these additional tuples are stored into the table queue, and control is returned to the operator reading from the table queue in response to the retry request. If the tuple-producing operators cannot generate the additional tuples, then a second end-of-file condition, termed a Permanent End-Of-File, occurs and control is returned to the operator reading from the table queue.

BRIEF DESCRIPTION OF THE DRAWINGS

Referring now to the drawings in which like reference numbers represented corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

HARDWARE ENVIRONMENT

Figure 1:
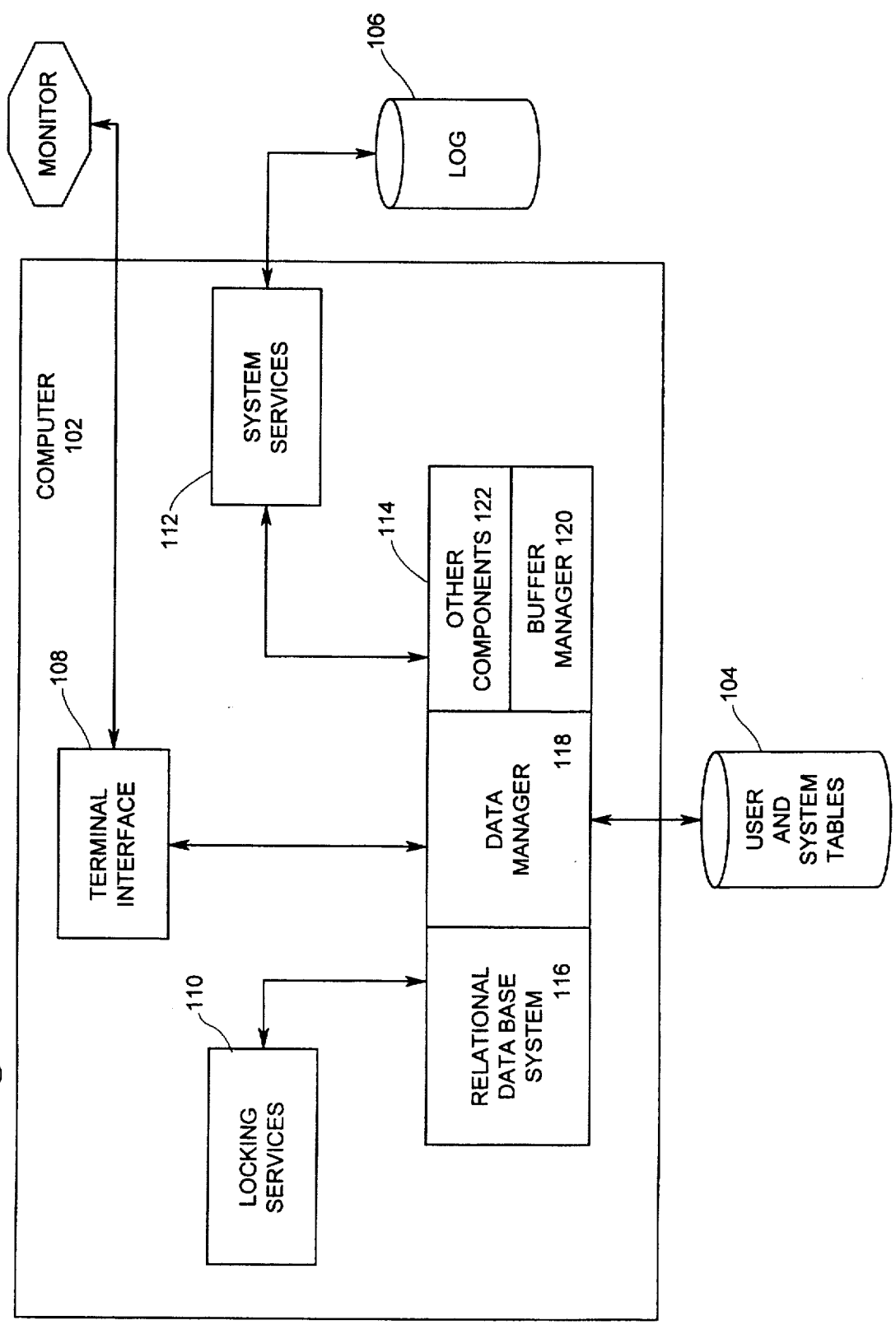
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more electronic storage devices 104 and 106, such as fixed and removable disk drives and tape drives, that store one or more relational databases as well as operating systems and applications software.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS, AIX, or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

INTERACTIVE SQL EXECUTION

Figure 2:
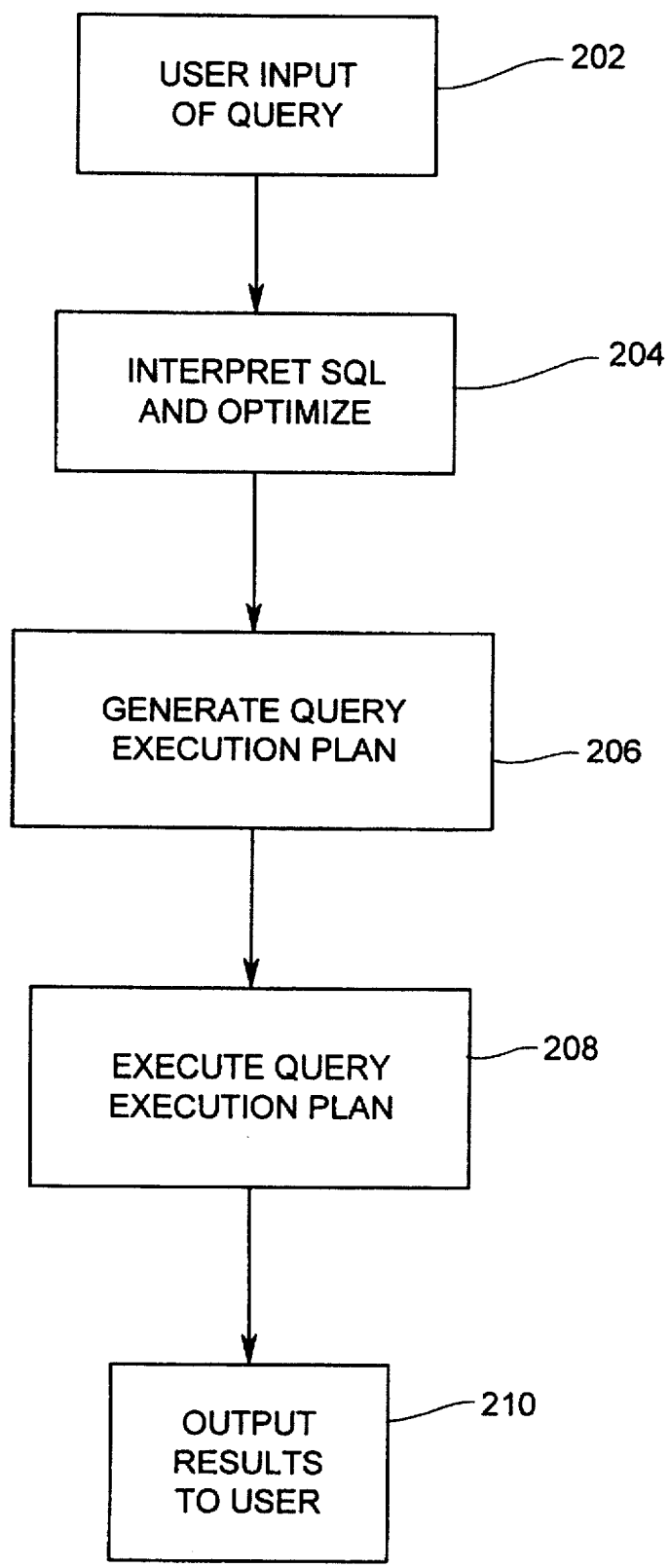
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query. Block 206 represents the step of generating a compiled set of runtime structures called a query execution plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the query execution plan, and block 210 represents the output of the results of the executed query execution plan to the user.

EMBEDDED/BATCH SOL EXECUTION

Figure 3:
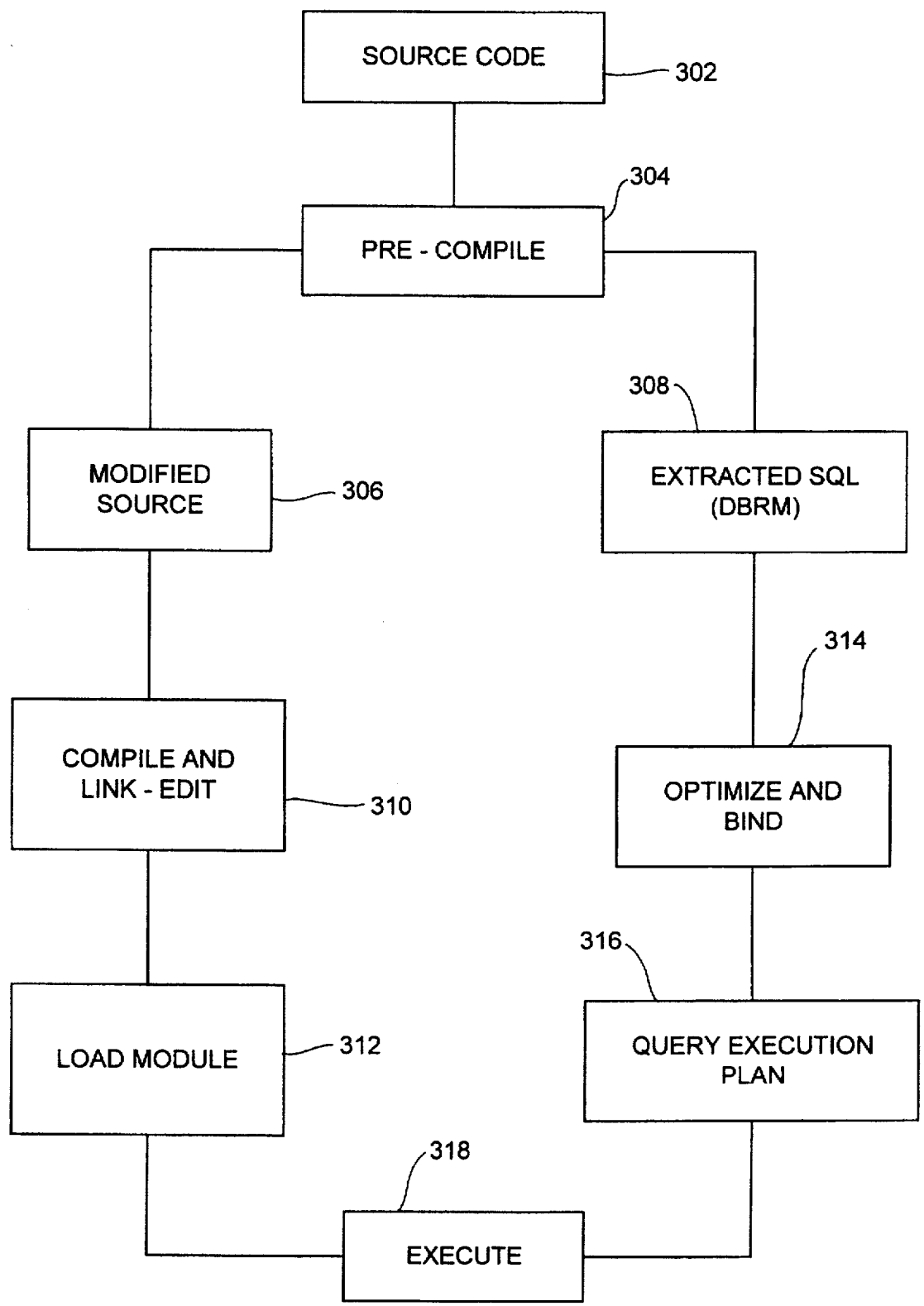
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the query execution plan 316. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and query execution plan 316 are then executed together at step 318.

DIRECTED ACYCLIC GRAPH REPRESENTATIONS OF SQL QUERIES

Figure 4:
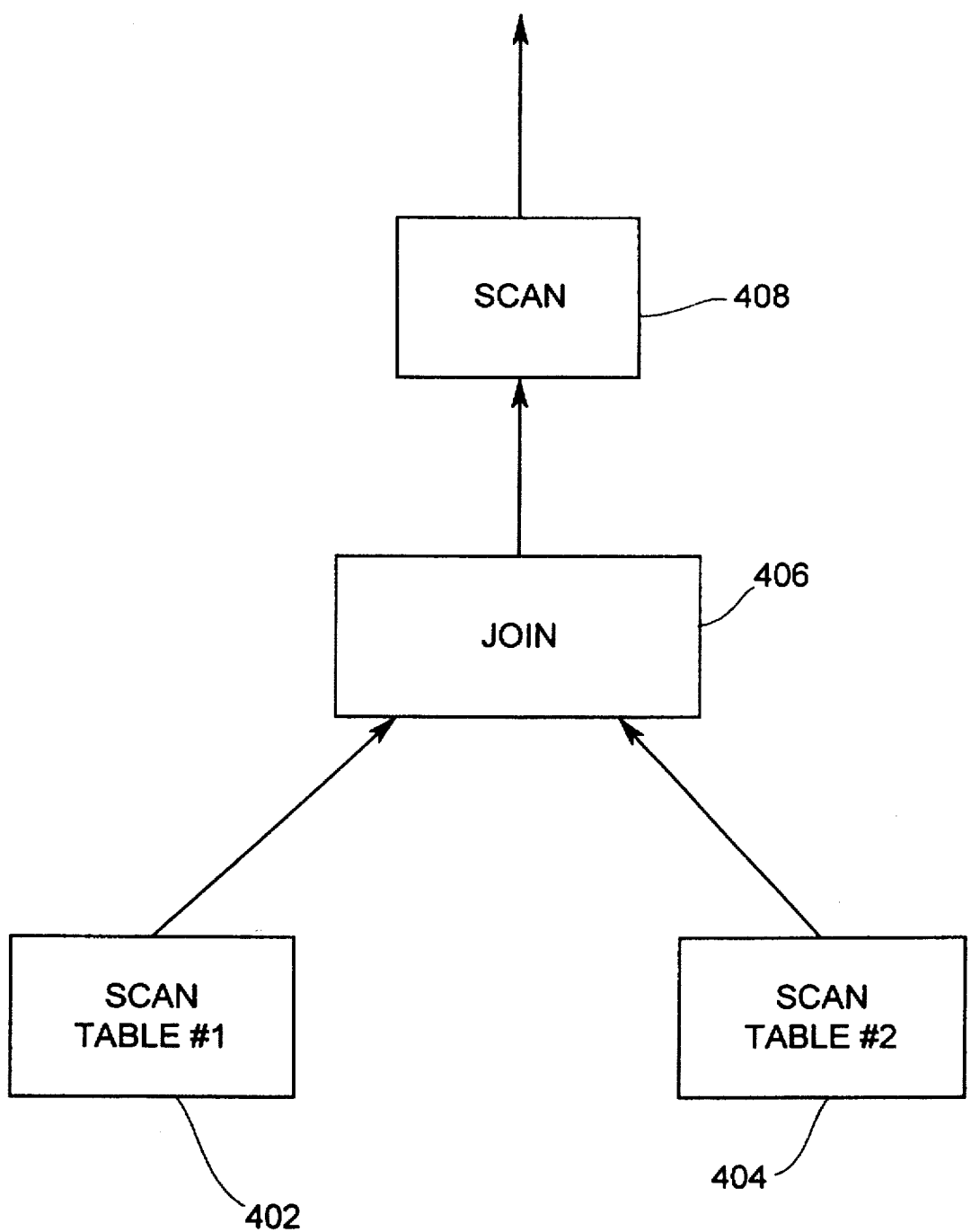
FIG. 4 is a data flow diagram that illustrates a directed acyclic graph (DAG) according to the present invention.

FIG. 4 is a data flow diagram that illustrates a directed acyclic graph (DAG) according to the present invention. The DAG represents a query execution plan of a non-recursive SQL query. Each node 402,404,406, and 408 in the DAG represents a record producing operator such as a join operator or a scan operator (or they could be operators such as sort, union, etc.), and an arc from a first node to a second node in the DAG indicates that a first operator represented by the first node generates a stream of records used as input by a second operator represented by the second node. The passing of records in the direction of the arc is referred to as data flow, and the passing of requests in the opposite direction of the arc is referred to as control flow.

Some operators, such as scan, union, and join, produce records and pass them to the next operator in the sequence, and thus are referred to as record producers, while other operators, such as expression evaluators, do not produce any records. Generally, a record producing operator in the query evaluation plan generates records one at a time by performing its designated operation such as joining two tables, filtering an input stream, accessing a base table, etc., and then returning a record in its output stream.

A calling operator sends a retry signal to its input record producing operator in the thread to request more records. Retry signals travel opposite the data flow of the thread and thus represent control flow in the arc in the DAG. In response to a retry operator, a record producing operator returns the next qualifying record in its output stream.

A record producing operator returns an EOF indicator to the calling operator when there are no more records to return. The calling operator also returns EOF indicators when appropriate for its operation, which is usually when their input operators return an EOF indicator. Note that some operators, such as an existential subquery operator that tests for the existence of a record by examining an input stream until the desired record is found, can return their results before their input stream returns an EOF indicator.

The DAG has a single node 408 called the root node that is the last record producing operator of the DAG and that is reachable from all other nodes in the DAG. The root node 408 represents the output of the query, and an output record is obtained by calling the root node operator. The entire query answer-set or result table is obtained by repeatedly calling the root node operator, wherein a single record is obtained per call until the root node 404 operator returns an End-of-File (EOF) indicator. The query answer-set or result table is complete when the root node operator returns an EOF indicator to the application software.

PSEUDO-CODE IMPLEMENTATIONS OF DIRECTED ACYCLIC GRAPHS

The RDBMS software typically compiles a SQL query into pseudo-code for execution. This pseudo-code, called "threaded code" in DB2, implements the behavior of the data flow and control flow of the DAG. Operators in a thread are used to implement the conceptual relational operations.

Generally, a query evaluation plan is represented by one or more threads performed by the RDBMS software, wherein each thread is a set of operators terminated by an exit operator. One example of such a sequence is:

{SCAN, BIND-OUT, EXIT} which scans a table, returns the records to the caller, and then terminates. In the above example, the scan operator transfers control to the next operator in sequence (BIND-OUT) by performing a GOTO function. The GOTO function is an example of control flow in the DAG from one node to another node along an arc.

Figure 5:
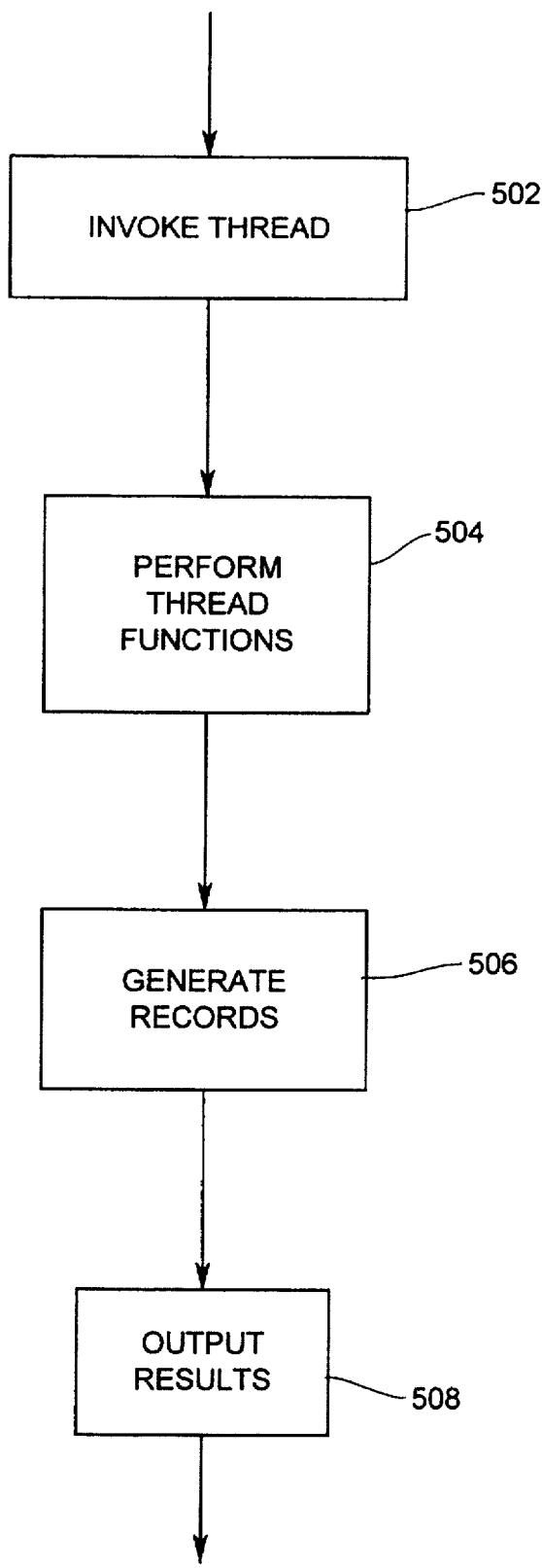
FIG. 5 is a flowchart generally illustrating the operation of a thread in accordance with the present invention.

FIG. 5 is a flowchart generally illustrating the operation of a thread in accordance with the present invention. Block 502 represents the initiation of the thread when it is invoked or "called" by another thread or by a control process within the RDBMS software. Block 504 represents the thread performing its associated functions, which may include the retrieval and/or manipulation of tuples or records from one or more tables. Block 506 represents the thread generating records, and block 508 represents the thread outputting the records, either by returning the records to the caller that invoked it, or by invoking another thread and transferring the records thereto.

TABLE QUEUES IN SQL QUERIES

In the present invention, a table queue is used in the execution of an SQL query as a means of pipelining data to an operator or display, or as a means of sharing a stream of records by two or more operators. Generally, the table queue is a FIFO (first-in first-out) queue, wherein records are read from the table queue in the same order that they are stored into the table queue. Of course, those skilled in the art will recognize that the table queues could be LIFO (last-in first-out) queues or could use any other type of queue organization.

Figure 6:
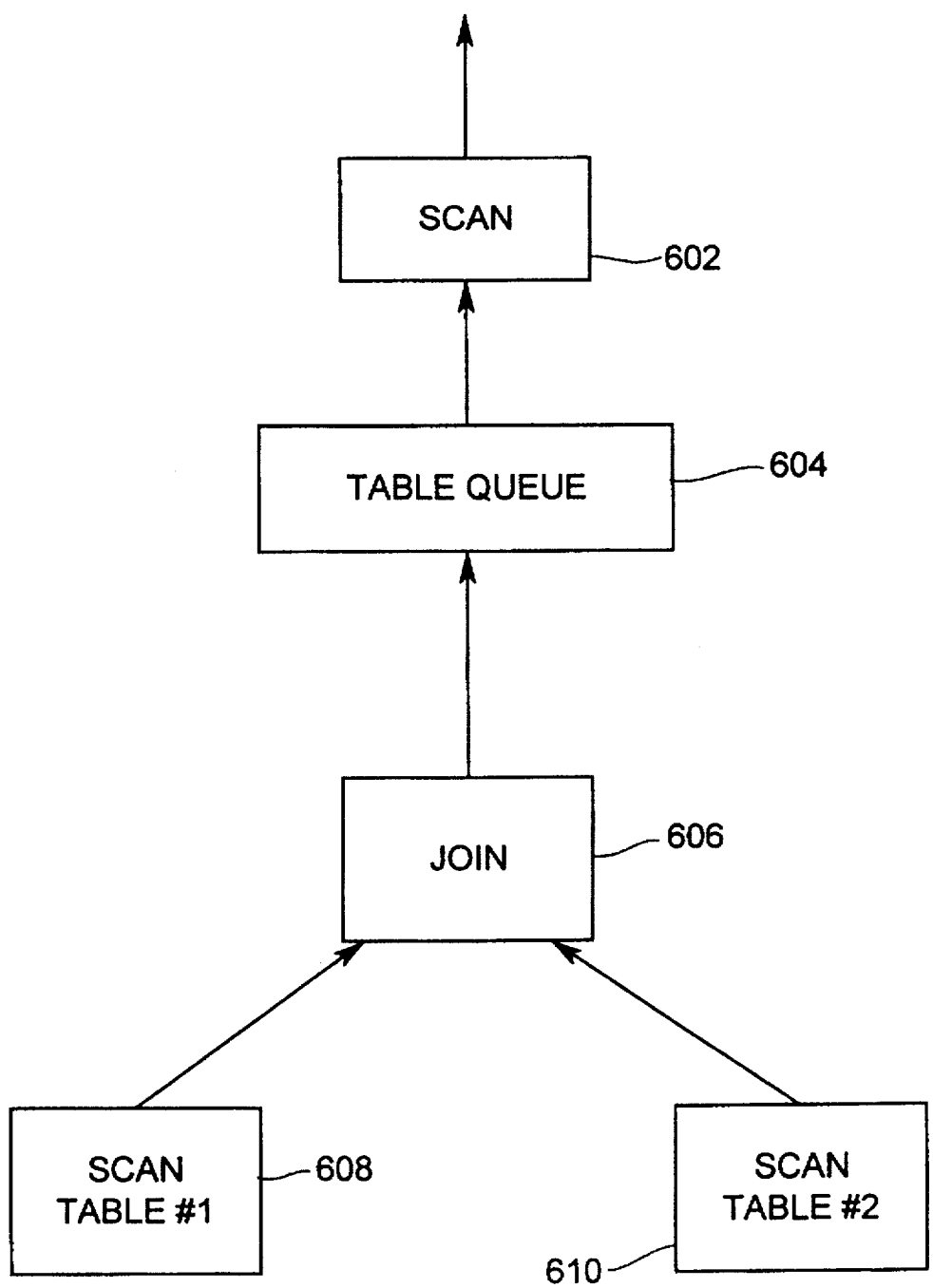
FIG. 6 is a data flow diagram that illustrates a directed acyclic graph (DAG) using a table queue according to the present invention.

FIG. 6 is a data flow diagram that illustrates a directed acyclic graph (DAG) comprised of a root node 602, a table queue 604, and record producing nodes 606, 608, and 610, according to the present invention. In the present invention, table queues are implemented as a node 604 comprising a set of EVAL (evaluation) operators and a single EVAL object. Generally, there is one EVAL operator associated with each operator accessing the table queue 604. The EVAL object associated with each table queue 604 is used to store the state (e.g., a BUSY state) of the table queue 604. The table queue 604 itself is a temporary table that stores the records that have been produced by its input record producing operators 606, 608, and 610. Table queues 604 can also be used in place of temporary tables (TMPS) in query evaluation.

One advantage of table queues 604 is efficient slow materialization. For instance, a table queue 604 can be used for a materialized view. Use of regular TMPS in this case requires the entire view to be materialized before it is used. However, using table queues 604, the view generates a set of records, e.g., two pages worth of records, and makes the set available for display to the users. Once this set is exhausted, the view generates a next set of records. This technique, called slow materialization, improves the first response to queries for users.

Each operator 602 reading from a table queue 604 generally performs a scan operation over the table queue 604. The scan operator 602 reads the records from the table queue 604 until an end-of-file condition is reached and a first EOF indicator, termed a Temporary-End-Of-File (TEOF) indicator, is generated. At this point, the scan operator 602 transmits a retry request to the EVAL operator associated with the table queue 604 to produce more records for storage into the table queue 604. The EVAL operator, in turn, transmits the retry request to the lower-level record producing operators 606, 608, and 610, to produce more records. In response to the retry request from the EVAL operator, the lower-level record producing operators 606, 608, and 610, either produce more records for storage into the table queue 604 or return a second EOF indicator, termed a Permanent-End-Of-File (PEOF) indicator. If the record producing operators 606, 608, and 610, have produced additional records, then eventually the scan operator 602 regains control and resumes reading the newly-produced records from the table queue 604. However, if the record producing operators 606, 608, and 610, do not produce additional records, then the scan operator 602 receives the second PEOF indicator.

RECURSION USING TABLE QUEUES

In the present invention, recursion occurs when a scan operator scanning over a table queue is also a record producer that produces records that flow into the same table queue. This results in a query evaluation plan that is no longer acyclic, but instead is a directed cyclic graph (DCG). The implementation of the DCG is illustrated using the example query given below.

In the example query, an organization hierarchy is defined as follows:

```
CREATE TABLE ORGHIERARCHY
       (
       MGRNO CHAR(2),
       EMPNO CHAR(2),
       . . .
       );
``` wherein the ORGHIERARCHY table provides a management hierarchy that captures who (EMPNO=employee number) is reporting to who (MGRNO=manager number) in the organization.

A task force hierarchy is defined as follows:

```
CREATE TABLE TASKFORCE
       (
       HEAD CHAR(2),
       MEMBER CHAR(2),
       . . .
       );
``` wherein the TASKFORCE table provides a task force hierarchy that captures who (MEMBER) is reporting to who (HEAD) in different task forces.

Using these tables, assume that the following question needs to be answered: "Find all the people that report to Smith directly or indirectly through any combination of official organization hierarchy and taskforce hierarchy." For example, the following path is valid: "X reports to Y, who is a member of a task force that has Z as its head, who reports to Smith."

The above query is answered by starting from the node "SMITH." The query goes down one level in the organization and task force hierarchies. For each of the results, the search is repeated on both hierarchies, regardless of which hierarchies produced the result in the previous iteration.

An example of an SQL query that accomplishes this result follows:

```
WITH RPS (MGRNO, EMPNO, LEVEL ) AS
    (
    SELECT ROOT.MGRNO, ROOT.EMPNO, 1
    FROM ORGHIERARCHY ROOT
    WHERE ROOT.MGRNO = 'SMITH'
    UNION ALL
    SELECT ROOT.HEAD, ROOT.MEMBER, 1
    FROM TASKFORCE ROOT
    WHERE ROOT.HEAD = 'SMITH'
    UNION ALL
    SELECT CHILD.MGRNO, CHILD.EMPNO, PARENT.LEVEL+1
    FROM RPS PARENT, ORGHIERARCHY CHILD
    WHERE PARENT.EMPNO = CHILD.MGRNO
            AND PARENT.LEVEL = 100

UNION ALL
    SELECT CHILD.HEAD, CHILD.MEMBER, PARENT.LEVEL+1
    FROM RPS PARENT, TASKFORCE CHILD
    WHERE PARENT.EMPNO = CHILD.HEAD
            AND PARENT.LEVEL = 100

)
SELECT DISTINCT EMPNO FROM RPS
ORDER BY EMPNO;
```

In the above example, RPS is a result table comprised of columns MGRNO, EMPNO, LEVEL that is generated from the various SELECT and UNION operations.

The first set of SELECT and UNION operations used in generating the RPS table comprise the following:

```
SELECT ROOT.MGRNO, ROOT.EMPNO, 1
FROM ORGHIERARCHY ROOT
WHERE ROOT.MGRNO = 'SMITH'
UNION ALL
```

The above operations go down the organization hierarchy one level starting with "SMITH".

The second set of SELECT and UNION operations used in generating the RPS table comprise the following:

```
SELECT ROOT.HEAD, ROOT.MEMBER, 1
FROM TASKFORCE ROOT
WHERE ROOT.HEAD = 'SMITH'
UNION ALL
```

The above operations go down the task force hierarchy one level SELECT CHILD.MGRNO, CHILD.EMPNO, PARENT.LEVEL+1
The third set of SELECT and UNION operations used in generating the RPS table comprise the following:

UNION ALL

The above operations go down the organization hierarchy one level starting from the previous results.

The fourth set of SELECT and UNION operations used in generating the RPS table comprise the following:

```
SELECT CHILD.HEAD, CHILD.MEMBER, PARENT.LEVEL+1
FROM RPS PARENT, TASKFORCE CHILD
WHERE PARENT.EMPNO = CHILD.HEAD
       AND PARENT.LEVEL = 100
```

The above operations go down the task force hierarchy one level starting from the previous results.

Finally, after the RPS table is generated, the following SELECT operation is performed:

```
SELECT DISTINCT EMPNO FROM RPS
ORDER BY EMPNO;
```

The above operations provide the final results and eliminate any duplicates from RPS.

Directed Cyclic Graph Of Example Query

Figure 7:
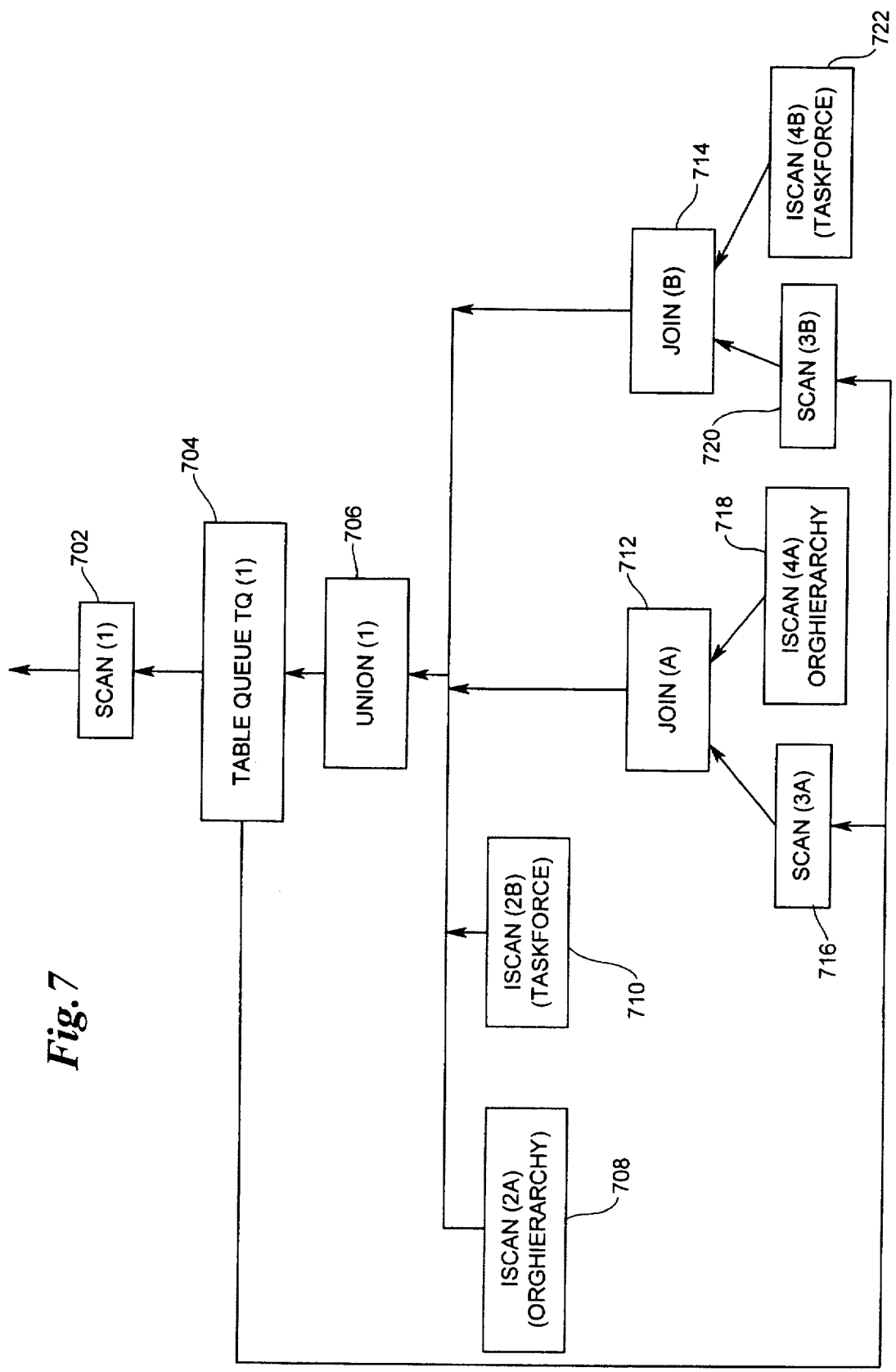
FIG. 7 is a data flow diagram illustrating a directed cyclic graph (DCG) for the example query.

FIG. 7 is a data flow diagram illustrating a directed cyclic graph (DCG) for the example query. For ease of explanation, assume that there is an index on ORGHIERARCHY(MGRNO, EMPNO) and an index on TASKFORCE(HEAD, MEMBER), and thus scan operations are performed using the ISCAN (index scan) operation rather than the normal SCAN operation. As can be seen from the arcs, recursion forms a cycle in the DCG, wherein the cycle is from the table queue TQ(1) (704) to both the SCAN(3A)

operator (716) and SCAN(3B) operator (720), to the JOIN(A) operator (712) and JOIN(B) operators (714), to the UNION(1) operator (706), and finally back to the table queue TQ(1) (704). The execution of the query is very similar to a non-recursive execution, except for handling of the EVAL operator associated with the table queue TQ(1) (704).

When the SCAN(1) operator (702) calls the EVAL operator of the table queue TQ(1) (704), the EVAL operator changes the state of EVAL object of the table queue TQ(1) (704) to "BUSY." Eventually, the SCAN(3A) operator (716) gets control and reads records from the table queue TQ(1) (704) until all records have been read and an EOF indicator generated. Then, the SCAN(3A) operator (716) tries to transmit a retry request for more records to the EVAL operator of the table queue TQ(1) (704). The only special consideration for recursion is that before a scan operator requests that the EVAL operator of the table queue TQ(1) (704) produce more records, the scan operator must make sure that the table queue TQ(1) (704) is not in the "BUSY" state. If the table queue TQ(1) (704) is busy, then it returns an EOF indicator to the scan operator. The reason for this is that the EVAL operator for the table queue TQ(1) (704) already has an outstanding request to the producing operator(s) up-stream from the table queue TQ(1) (704) to produce more records.

The "BUSY" state of EVAL operator prevents infinite looping in the call structure of the DCG, since the cycles of the DCG always are formed at a table queue. As operators are called, a "path" is formed in the DCG. The path can only loop back on itself at the table queue, and thus the EVAL operator of the table queue is used to detect this attempted loop using the "BUSY" state. Thus, if a table queue is called twice on the same path, the EVAL operator will immediately return a second EOF indicator to the second caller. This is sufficient to guarantee that the recursive query evaluation will terminate correctly for both linear recursion and non-linear recursion, and will not generate an infinite loop.

One important aspect of the present invention is that it does not require recursive invocation of operators, and this considerably reduces the complexity of the code-generation and runtime interpreter components of the RDBMS software. The data flow and control flow for the DCG is the same as the interaction between the scan operators, table queue and record producing operators described in the non-recursive case.

Maximal, Strongly Connected Subgraphs

The DCG of a recursive query has one or more maximal, strongly connected subgraphs, wherein a subgraph is strongly connected in the sense that every node in the subgraph is reachable from every other node in the subgraph by traversing the arcs of the subgraph, and a subgraph is maximal in the sense that there is no other containing subgraph that is also strongly connected.

In the example of FIG. 7, there are six maximal, strongly connected subgraphs. Five of them each consist of the single nodes SCAN(1) (702), ISCAN(2A) (708), ISCAN(2B) (710), ISCAN(4A) (718), and ISCAN(4B) (722). The sixth maximal, strongly connected subgraph consists of the nodes TQ(1) (704), UNION(1) (702), JOIN(A) (712), JOIN(B) (714), SCAN(3A) (716), SCAN(3B) (720), and all the arcs between any two nodes in this set of nodes.

If a single node in a non-strongly connected portion of the graph is considered to be a maximal, strongly connected subgraph by itself, then the maximal, strongly connected subgraphs of the query graph partition the query graph. Furthermore, the reduced graph formed by replacing each maximal, strongly connected subgraph with a single node is a DAG, and is called a stratification of the query graph. Each node of the stratification is referred to as a stratum. Note that the output operators of any multi-operator stratum are necessarily table queues.

An EOF indication that is generated by the table queue for the second caller on a recursire path does not indicate that no more records will ever be returned by the table queue to this caller. Instead, it only means that none are available at this time. Hence, this EOF indicator is interpreted as a Temporary-End-Of-File (TEOF) indicator. As the TEOF indicator is propagated along the call path, one of the operators on the path may be able to generate a record by calling a different one of its input operators. This record may eventually cause a record to be returned to the table queue, and hence returned to the first caller of the table queue. When the path of operator calls is traversed again later, the second call to the table queue will be able to return a record instead of an EOF indicator.

When the inputs to the UNION which is involved in recursion have all generated an EOF indicator in sequence with no intervening records, then the UNION should return an EOF indicator.

As operators of the query read the stored tuples from the table queue, a first end-of-file condition, termed a Temporary End-Of-File, occurs when all of the tuples currently stored in the table queue have been read and is returned to the operator. A retry request for additional tuples is generated by the operator through the table queue to the tuple-producing operators. If the tuple-producing operators can generate additional tuples, then these additional tuples are stored into the table queue and control is returned to the operator reading from the table queue in response to the retry request. If the tuple-producing operators cannot generate the additional tuples, then a second end-of-file condition, termed a Permanent End-Of-File, occurs and control is returned to the operator reading from the table queue.

The termination of the recursive cycles in a stratum with cycles of a query graph is determined by the table queues that connect one stratum with another. When an EOF indicator is returned by a table queue between strata, then no further records will ever be produced by this table queue, and this EOF indicator can be interpreted as a Permanent-End-Of-File (PEOF) indicator. When the input to a table queue that connects one stratum to another has returned an PEOF indicator, then it is known that all paths have been traversed backward from the table queue in the DCG and no records can be generated by any operator that feeds the table queue, either directly or indirectly.

In FIG. 7, the table queue TQ(1) (704) connects one stratum to another since the SCAN(i) operator (702) is in a different stratum than the UNION(I) operator (706). The UNION(1) operator (706) gets its records from any of its inputs in any order. Suppose the UNION(i) operator (706) reads from the ISCAN(2A) operator (708) first, and gets all employees that directly refer to "SMITH." An EOF indicator coming from this operand is interpreted as a PEOF indicator, since this input is part of a different stratum (i.e., it is not part of the recursion that the table queue TQ(1) (704) participates in). The UNION(i) operator (706) will never ask this operand to produce any more records. The same scenario holds for the ISCAN(2B) operator (710).

The UNION(i) operator (706) asks the JOIN(A) operator (712) to produce records, wherein the records originate from the table queue TQ(1) (704). When the JOIN(A) operator (712) returns an EOF indicator, the UNION(i) operator (706) interprets it as TEOF indicator, since the next operand of the JOIN(B) operator (714) may later produce more records, which should be processed by the JOIN(A) operator (712). Then, the UNION(I) operator (706) asks the JOIN(B) operator (714) to produce records. After getting an EOF indicator from the JOIN(B) operator (714), the UNION(i) operator (706) goes back to the JOIN (A) operator (712) asking for more records. The UNION (1) operator (706) iterates over its inputs which belong to its stratum, asking for records, until in one consecutive sweep of inputs, they all return an EOF indicator. At this time, the UNION(i) operator (706) cannot produce any more records and returns an EOF indicator.

Once a table queue between two strata has returned an EOF indicator (interpreted as a PEOF indicator), the table queue propagates "CLOSE SCAN" operations to all of its input tuple-producing operators. These CLOSE SCAN operations are propagated to all of the operators in the stratum, and any operators in input strata that have not yet been closed. Performing CLOSE SCAN operations as early as possible can be important to transactions running in level-two consistency, as it allows locks acquired in scan operations to be released. Also, the CLOSE SCAN operations drop all the temporary tables in a stratum, thereby releasing their storage.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses an evaluation strategy for the execution of SQL queries involving recursion and table queues in a relational database management system. The table queue is established for the query in the memory of the computer, and tuples are generated by tuple-producing operators in the query for storage into the table queue. As operators of the query read the stored tuples from the table queue, a first end-of-file condition, termed a Temporary End-Of-File, occurs when all of the tuples currently stored in the table queue have been read and control is returned to the operator reading from the table queue. A retry request for additional tuples is generated by the operator through the table queue to the tuple-producing operators. If the tuple-producing operators can generate additional tuples, then these additional tuples are stored into the table queue and control is returned to the operator reading from the table queue in response to the retry request. If the tuple-producing operators cannot generate the additional tuples, then a second end-of-file condition, termed a Permanent End-Of-File, occurs and control is returned to the operator reading from the table queue. With the introduction of table queues, slow materialization, retry signals, and the addition of the busy state for the recursive case, the present invention is able to handle recursive queries (cyclic graph) in much the same way as non-recursive queries (acyclic graph).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing an SQL query in a computer having a memory, the SQL query being executed by the computer to retrieve data from a relational database stored in a electronic storage device coupled to the computer, the method comprising the steps of:

(a) establishing a table queue for the query in the memory of the computer;

(b) retrieving desired tuples from the relational database stored in the electronic storage device coupled to the computer;

(c) storing the retrieved tuples into the table queue in the memory of the computer;

(d) retrieving the stored tuples from the table queue in the memory of the computer, wherein the retrieved tuples are operated on in accordance with the query;

(e) generating a first end-of-file indication in the memory of the computer when all of the tuples stored in the table queue have been retrieved; and (f) generating a second end-of-file indication in the memory of the computer after the first end-of-file indication has been generated when all of the desired tuples stored in the relational database have been retrieved.

2. The method of claim 1 above, further comprising the step of performing early close operations when the second end-of-file indication is generated.

3. The method of claim 1 above, wherein the retrieving step (b) further comprises the step of retrieving a finite number of the desired tuples from the relational database in response to an operation performed by the query.

4. The method of claim 1 above, further comprising the steps of:

(1) generating the first end-of-file indication in response to a request to retrieve the tuples from the table queue;

(2) requesting additional tuples from a tuple producing function performed by the computer in accordance with the query for storage into the table queue; and (3) generating the second end-of-file indication in response to the request for additional tuples for storage into the table queue, when there are no additional tuples that can be retrieved.

5. The method of claim 1 above, further comprising the steps of:

(1) retrieving the tuples from the table queue in the memory of the computer to be operated on in accordance with the query;

(2) generating new tuples in the memory of the computer from the retrieved tuples; and (3) storing the new tuples into the table queue in the memory of the computer.

6. A method of executing an SQL query in a computer having a memory, the SQL query being executed by the computer to retrieve data from a relational database stored in a electronic storage device coupled to the computer, the method comprising the steps of:

(a) performing an operation of the query in the memory of the computer, wherein the operation retrieves tuples from a table queue established in the memory of the computer;

(b) receiving an end-of-file indication from the table queue when all of the tuples stored in the table queue have been retrieved by the operation;

(c) generating a request for additional tuples from the table queue when the received end-of-file indication is a first occurrence of the end-of-file indication received by the operation, wherein the request results in the additional tuples being retrieved by a tuple producing function performed by the computer and stored into the table queue in accordance with the query; and (d) terminating the operation when the received end-of-file indication is a second occurrence of the end-of-file indication received by the operation.

7. A method of executing an SQL query in a computer having a memory, the SQL query being executed by the computer to retrieve data from a relational database stored in a electronic storage device coupled to the computer, the method comprising the steps of:

(a) establishing a table queue for the query in the computer;

(b) retrieving desired tuples from the relational database and storing the retrieved tuples into the table queue;

(d) retrieving the stored tuples from the table queue, wherein the retrieved tuples are operated on in accordance with the query;

(e) setting a busy-state indicator in the computer while tuples are being retrieved from the table queue;

(f) generating a first end-of-file indication in the computer when all of the tuples stored in the table queue have been retrieved;

(g) generating a retry request in the computer in response to the first end-of-file indication to retrieve additional tuples from the table queue;

(h) retrieving additional tuples from the relational database after the first end-of-file indication has been generated when all the busy-state indicator is not set, and storing the retrieved tuples into the table queue; and (i) generating a second end-of-file indication in the computer after the first end-of-file indication has been generated when the busy-state indicator is set.

8. An apparatus for executing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for establishing a table queue for the query in the memory of the computer;

(d) means, performed by the computer, for retrieving desired tuples from the relational database stored in the electronic storage device coupled to the computer;

(e) means, performed by the computer, for storing the retrieved tuples into the table queue in the memory of the computer;

(f) means, performed by the computer, for retrieving the stored tuples from the table queue in the memory of the computer, wherein the retrieved tuples are operated on in accordance with the query;

(g) means, performed by the computer, for generating a first end-of-file indication in the memory of the computer when all of the tuples stored in the table queue have been retrieved; and (h) means, performed by the computer, for generating a second end-of-file indication in the memory of the computer after the first end-of-file indication has been generated when all of the desired tuples stored in the relational database have been retrieved.

9. The apparatus of claim 8 above, further comprising means for performing early close operations when the second end-of-file indication is generated.

10. The apparatus of claim 8 above, wherein the means for retrieving (d) further comprises means for retrieving a finite number of the desired tuples from the relational database in response to an operation performed by the query.

11. The apparatus of claim 8 above, further comprising:

(1) means for generating the first end-of-file indication in response to a request to retrieve the tuples from the table queue;

(2) means for requesting additional tuples from a tuple producing function performed by the computer in accordance with the query for storage into the table queue; and (3) means for generating the second end-of-file indication in response to the request for additional tuples for storage into the table queue, when there are no additional tuples that can be retrieved.

12. The apparatus of claim 8 above, further comprising:

(1) means for retrieving the tuples from the table queue in the memory of the computer to be operated on in accordance with the query;

(2) means for generating new tuples in the memory of the computer from the retrieved tuples; and (3) means for storing the new tuples into the table queue in the memory of the computer.

13. An apparatus for executing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for performing an operation of the query in the memory of the computer, wherein the operation retrieves tuples from a table queue established in the memory of the computer;

(d) means, performed by the computer, for receiving an end-of-file indication from the table queue when all of the tuples stored in the table queue have been retrieved by the operation;

(e) means, performed by the computer, for generating a request for additional tuples from the table queue when the received end-of-file indication is a first occurrence of the end-of-file indication received by the operation, wherein the request results in the additional tuples being retrieved by a tuple producing function performed by the computer and stored into the table queue in accordance with the query; and (f) means, performed by the computer, for terminating the operation when the received end-of-file indication is a second occurrence of the end-of-file indication received by the operation.

14. An apparatus for executing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for establishing a table queue for the query;

(d) means, performed by the computer, for retrieving desired tuples from the relational database and for storing the retrieved tuples into the table queue;

(e) means, performed by the computer, for retrieving the stored tuples from the table queue, wherein the retrieved tuples are operated on in accordance with the query;

(f) means, performed by the computer, for setting a busy-state indicator while tuples are being retrieved from the table queue;

(g) means, performed by the computer, for generating a first end-of-file indication when all of the tuples stored in the table queue have been retrieved;

(h) means, performed by the computer, for generating a retry request in response to the first end-of-file indication to retrieve additional tuples from the table queue;

(i) means, performed by the computer, for retrieving additional tuples from the relational database after the first end-of-file indication has been generated when all the busy-state indicator is not set, and for storing the retrieved tuples into the table queue; and (j) means, performed by the computer, for generating a second end-of-file indication after the first end-of-file indication has been generated when the busy-state indicator is set.

15. A program storage device readable by a computer, tangibly embodying a program of instructions executable by the computer to perform method steps for executing an SQL query in a computer having a memory, the SQL query being performed by the computer to retrieve data from a relational database stored in an electronic storage device coupled to the computer, the method comprising the steps of:

(a) establishing a table queue for the query in the memory of the computer;

(b) retrieving desired tuples from the relational database stored in the electronic storage device coupled to the computer;

(c) storing the retrieved tuples into the table queue in the memory of the computer;

(d) retrieving the stored tuples from the table queue in the memory of the computer, wherein the retrieved tuples are operated on in accordance with the query;

(e) generating a first end-of-file indication in the memory of the computer when all of the tuples stored in the table queue have been retrieved; and (f) generating a second end-of-file indication in the memory of the computer after the first end-of-file indication has been generated when all of the desired tuples stored in the relational database have been retrieved.

16. The method of claim 15 above, further comprising the step of performing early close operations when the second end-of-file indication is generated.

17. The method of claim 15 above, wherein the retrieving step (b) further comprises the step of retrieving a finite number of the desired tuples from the relational database in response to an operation performed by the query.

18. The method of claim 15 above, further comprising the steps of:

(1) generating the first end-of-file indication in response to a request to retrieve the tuples from the table queue;

(2) requesting additional tuples from a tuple producing function performed by the computer in accordance with the query for storage into the table queue; and (3) generating the second end-of-file indication in response to the request for additional tuples for storage into the table queue, when there are no additional tuples that can be retrieved.

19. The method of claim 15 above, further comprising the steps of:

(1) retrieving the tuples from the table queue in the memory of the computer to be operated on in accordance with the query;

(2) generating new tuples in the memory of the computer from the retrieved tuples; and (3) storing the new tuples into the table queue in the memory of the computer.

20. A program storage device readable by a computer, tangibly embodying a program of instructions executable by the computer to perform method steps for executing an SQL query in a computer having a memory, the SQL query being performed by the computer to retrieve data from a relational database stored in an electronic storage device coupled to the computer, the method comprising the steps of:

(a) performing an operation of the query in the memory of the computer, wherein the operation retrieves tuples from a table queue established in the memory of the computer;

(b) receiving an end-of-file indication from the table queue when all of the tuples stored in the table queue have been retrieved by the operation;

(c) generating a request for additional tuples from the table queue when the received end-of-file indication is a first occurrence of the end-of-file indication received by the operation, wherein the request results in the additional tuples being retrieved by a tuple producing function performed by the computer and stored into the table queue in accordance with the query; and (d) terminating the operation when the received end-of-file indication is a second occurrence of the end-of-file indication received by the operation.

21. A program storage device readable by a computer, tangibly embodying a program of instructions executable by the computer to perform method steps for executing an SQL query in a computer having a memory, the SQL query being performed by the computer to retrieve data from a relational database stored in an electronic storage device coupled to the computer, the method comprising the steps of:

(a) establishing a table queue for the query in the computer;

(b) retrieving desired tuples from the relational database and storing the retrieved tuples into the table queue;

(d) retrieving the stored tuples from the table queue, wherein the retrieved tuples are operated on in accordance with the query;

(e) setting a busy-state indicator in the computer while tuples are being retrieved from the table queue;

(f) generating a first end-of-file indication in the computer when all of the tuples stored in the table queue have been retrieved;

(g) generating a retry request in the computer in response to the first end-of-file indication to retrieve additional tuples from the table queue;

(h) retrieving additional tuples from the relational database after the first end-of-file indication has been generated when all the busy-state indicator is not set, and storing the retrieved tuples into the table queue; and (i) generating a second end-of-file indication in the computer after the first end-of-file indication has been generated when the busy-state indicator is set.

* * * * *

UNITED STATES PATENT AND TRADEMARK OFFICE
CERTIFICATE OF CORRECTION

PATENT NO. : 5,546,570

DATED : August 13, 1996

INVENTOR(S) : John A. McPherson, Jr. et al.

It is certified that error appears in the above-identified patent and that said Letters Patent is hereby corrected as shown below:

Column 3, line 42, "SOL" should read --SQL--.
Column 7, strike lines 54-62 and substitute therefor
--The above operations go down the task force hierarchy one level starting with "SMITH".
 The third set of SELECT and UNION operations used in generating the RPS table comprise the following:
      SELECT CHILD.MGRNO, CHILD.EMPNO, PARENT.LEVEL+1
      FROM RPS PARENT, ORGHIERARCHY CHILD
      WHERE PARENT.EMPNO = CHILD.MGRNO
         AND PARENT.LEVEL i = 100
      UNION ALL--
Column 10, line 54, "SCAN(i)" should read --SCAN(1)--

Signed and Sealed this

Tenth Day of December, 1996

Attest:

BRUCE LEHMAN

*Attesting Officer*      *Commissioner of Patents and Trademarks*